(No Model.)
E. L. HOWARD.
POINTING MECHANISM FOR NAILING MACHINES.
No. 426,274. Patented Apr. 22, 1890.
Fig. 1.
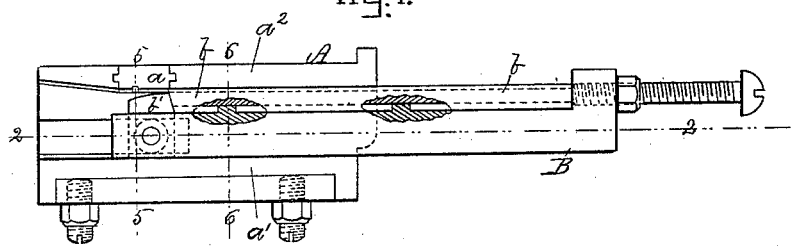
Fig. 2.
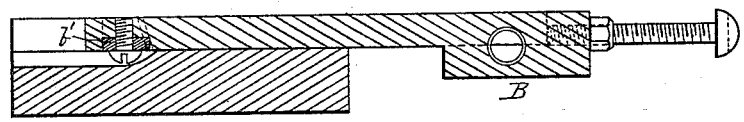
Fig. 3.
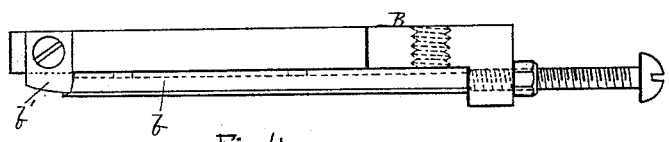
Fig. 4.
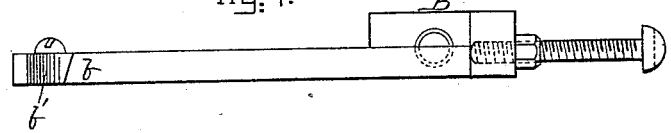
Fig. 5.  Fig. 6.  Fig. 7.
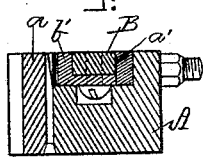 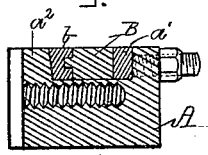 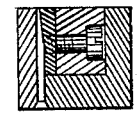
Fig. 8.
Witnesses.
Lauritz W. Möller.
John R. Snow.
Inventor
Elijah Leavitt Howard
by Maynadier & Beach
Attys.
THE NORRIS PETERS CO., PHOTO-LITHO., WASHINGTON, D. C.

UNITED STATES PATENT OFFICE.

ELIJAH L. HOWARD, OF HINGHAM, ASSIGNOR TO THE CORRUGATED WIRE FASTENING COMPANY, OF BOSTON, MASSACHUSETTS.

POINTING MECHANISM FOR NAILING-MACHINES.

SPECIFICATION forming part of Letters Patent No. 426,274, dated April 22, 1890.

Application filed January 31, 1890. Serial No. 338,828. (No model.)

*To all whom it may concern:*

Be it known that I, ELIJAH LEAVITT HOWARD, a citizen of the United States, residing at Hingham, in the county of Plymouth and State of Massachusetts, have invented an Improved Pointing Device for Sole-Nailing Machines, of which the following is a specification, reference being had to the accompanying drawings, forming a part hereof, in which—

Figure 1 is a bottom plan of my device; Fig. 2, a section on line 2 2 of Fig. 1. Figs. 3 and 4 are views of the cutter and its holder detached. Figs. 5 and 6 are sections on lines 5 5 and 6 6 of Fig. 1. Figs. 7 and 8 are corresponding sections on the old form of cutter.

In that form of my invention shown in the drawings the wire to be pointed is rectangular in cross-section and is fed through the die $a$, which is a piece of steel having a groove formed in it, which the wire fits and fills for part of the length of the groove; but that part of the wire which is to be cut away to form the point projects from the side of the die for the rest of the length of the groove. This is a construction familiar to those skilled in the art of pointing metallic fastenings for sole-nailing machines, and is sufficiently shown in Figs. 5 and 7, where the groove of die $a$ is shown in section, and also in Fig. 1, where it is shown in plan. (See also Fig. 6, which shows the slant of one wall of the die-holder, that slant corresponding to the slant of a portion of the grooved side of die $a$.) This die $a$ is rigidly secured in die-holder A in the usual way. The die-holder is formed with a groove to receive the knife and its holder, one wall of which groove is formed by the gib $a'$, and the opposite wall $a^2$ of which groove is slanted to correspond with the slant of the grooved side of die $a$. The knife $b$ is a bar of steel with one side slanting to correspond with the slanting wall of the die-holder and die and is mounted in the knife-holder B, so that the knife-holder B, with the knife in place, fits and fills the groove in the die-holder A. The knife-holder B also has secured to it the holding-cam $b'$, which is a hardened-steel block with that side next the grooved side of die $a$ curved in one direction only, as shown in Figs. 1, 3, and 4.

Much of what I have described closely resembles the die-holder, knife-holder, and holding-cam now in common use in sole-fastening machines; and my invention is in an improvement in this combination of parts, the main feature of my invention consisting in forming the die-holder with a gib and in supporting the knife directly against the slanting wall of the groove in the die-holder. Heretofore the groove in the die-holder has been formed as in Figs. 7 and 8, which are cross-sections of the die-holder and knife and its holder of the device now in common use, on which my invention is an improvement. In this old form of device the knife was rigidly attached by a screw to the knife-holder, as shown in Figs. 7 and 8, and the knife-holder was guided by the rectangular part of the groove in the die-holder, the excessively nice adjustment of the cutting-edge of the knife to the slanting wall of the die being obtained by an equally nice fit of the rectangular part of the knife-holder in the rectangular part of the groove—a matter requiring the highest skill and care on the part of the workman and made seriously defective by the slightest wear of the parts.

My invention consists in guiding the knife by the slanting wall of the groove—that is, by means of the gib $a'$ the slanting wall of the knife is pressed close against the slanting wall of the groove in the die-holder, and a far better adjustment of the cutting-edge of the knife to the slanting wall of the die is thereby obtained. Moreover, this adjustment is permanent, for any wear is provided for by setting up the gib in the well-known manner, so that not only is my knife better adjusted than is possible even with the greatest care and skill in the old device, but that adjustment is readily preserved at its best, whereas in the old device the adjustment at its best was scarcely equal to mine, while it was practically impossible to keep the knife properly adjusted.

It was formerly thought that it would not do to press the knife directly against the slanting wall of the groove of the knife-holder, lest the cutting-edge of the knife should catch in the groove of the die as that edge traveled past the groove, to the great injury of one or both; but after several months' practical use of my device I find that far better points are made with the knife so pressed against the slanting wall of the groove than with the old device, and in no case has the knife-edge or die-groove been injured. Of course the gib $a'$ must be set up even; but that is a matter readily learned by operators of sole-nailing machines.

My device is secured in the machine and operates in the same way as the old device, except that it is much more readily adjusted and kept in the nicest adjustment and makes the points with far greater uniformity and less wear of the knife. When in the machine, the die-holder is rigidly held with the larger part of the die-groove uppermost instead of lowermost, as in Figs. 1 and 5, and the wire is fed into the die-groove until its end is flush with the upper surface of the die, as shown in Figs. 1 and 5, (the lower surface in the machine.) The knife-holder is then moved forward, the curved surface of the holding-cam coming into contact with that part of the wire which projects from the die-groove and pressing it firmly into that part of the die-groove formed in the slanting wall of the die, and while the wire is so pressed by the holding-cam the upper part of the cutting-edge commences to cut off the wedge-shaped sliver, which is wholly cut off by the complete forward stroke of the knife. The knife-holder and knife are then retracted, the pointed length cut off and expelled from the die, and a new length of wire fed to be pointed as before.

What I claim as my invention is—

In combination, the die $a$, its holder A, both having a slanting wall, as shown, the knife $b$, with one side slanting to correspond with the slanting wall $a^2$, the knife-holder B, and the gib $a'$, the slanting wall of the knife being pressed against the slanting wall $a^2$ of the die-holder, all the parts being arranged and operating substantially as described.

E. L. HOWARD.

Witnesses:
J. E. MAYNADIER,
JOHN R. SNOW.